United States Patent
Wiget et al.

(10) Patent No.: US 7,660,305 B1
(45) Date of Patent: Feb. 9, 2010

(54) METHOD OF AND DEVICE FOR TRANSMITTING DATA PACKETS ON A NETWORK

(75) Inventors: Marcel Wiget, Cambridge, MA (US); Simon Bryden, La Roquette sur Siagne (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 798 days.

(21) Appl. No.: 10/148,420

(22) PCT Filed: Oct. 25, 2000

(86) PCT No.: PCT/IB00/01698

§ 371 (c)(1),
(2), (4) Date: Sep. 18, 2002

(87) PCT Pub. No.: WO02/35776

PCT Pub. Date: May 2, 2002

(51) Int. Cl.
*H04L 12/28* (2006.01)
(52) U.S. Cl. .................................. 370/392; 370/401
(58) Field of Classification Search ............... 370/254, 370/255, 252, 389, 392, 401
See application file for complete search history.

(56) References Cited

U.S. PATENT DOCUMENTS 6,266,337 B1 * 7/2001 Marco .......................... 370/410
6,304,912 B1 * 10/2001 Oguchi et al. ................ 709/238
6,473,424 B1 * 10/2002 DeJager et al. .............. 370/389
6,581,166 B1 * 6/2003 Hirst et al. ........................ 714/4

OTHER PUBLICATIONS

<http://www3.ietf.org/proceedings/99mar/I-D/draft-ieff-manet-olsr-00.txt> "Optimized Link State Routing Protocol draft-ietf-manet-olsr-00.txt" by Philippe Jacquet, Paul Muhlethaler, and Amir Qayyum. Nov. 18, 1998.*

* cited by examiner

*Primary Examiner*—Ricky Ngo
*Assistant Examiner*—Christine Ng
(74) *Attorney, Agent, or Firm*—Barnes & Thornburg LLP

(57) ABSTRACT

Data packets are transmitted from a network device having plural network interfaces. One of the plural network interfaces is designated for receiving data packets from a source address. First and second data packets are received from a device at the source address. It is determined if the second data packet was received over a network interface on the network device other than the designated network interface. If the second data packet was received over a network interface other than the designated network interface, it is determined if the first and second data packets were received within a predetermined period of time. If the first and second data packets were received within the predetermined period of time, the second data packet is discarded. If the first and second data packets were not received within the predetermined period of time, the second data packet is transmitted from the network device and a forwarding table on the network device is updated.

36 Claims, 3 Drawing Sheets

METHOD OF AND DEVICE FOR TRANSMITTING DATA PACKETS ON A NETWORK

BACKGROUND

This invention relates to transmitting data packets on a network so as to reduce data packet transmission loops.

Data packet looping can occur when there are parallel paths between two network devices, such as bridges. Initially, a "recipient" network device receives the data packet from a "transmitting" network device along one of the parallel paths. Upon receipt, the recipient device consults a stored forwarding table to determine an interface on the recipient device from which the data packet should be sent to reach the packet's intended destination.

If the forwarding table does not indicate which interface to use, the recipient device duplicates the packet and sends (i.e., "floods") copies of the packet out all of its interfaces, except the interface from which the packet was originally received. This results in a copy of the data packet being forwarded back to the transmitting device along the other (parallel) path. This process is repeated in the transmitting device, resulting in a data packet transmission loop between the transmitting and receiving devices.

In general, in one aspect, the invention is directed to transmitting data packets on a network. The invention features determining if two data packets having a same feature were received by a network device within a predetermined period of time, and discarding one of the two data packets if the two data packets were received by the network device within the predetermined period of time. Since "looping" packets pass back and forth between devices quickly, discarding data packets received within the predetermined period of time reduces packet looping.

This aspect may also include one or more of the following features. A later-received one of the two data packets is discarded. The function of determining if two data packets having a same feature were received includes receiving the two data packets at the network device, obtaining a difference between a time that the first of the two data packets was received and a time that a second of the data packets was received, and comparing the difference to the predetermined period of time.

The time that the first data packet was received is stored in a memory of the network device. The feature of the data packets is a source network device address. The network device includes a designated network interface over which data packets having the feature are received. The network device determines if one of the two data packets was received over a network interface on the network device other than the designated network interface. The network device performs the remainder of the process if one of the two data packets was received over a non-designated interface.

One of the two data packets is transmitted from the network device if the two data packets were not received by the network device within the predetermined period of time. The one of the two data packets is a later-received data packet. A forwarding table in the network device is updated based on a source device address in the one of the two data packets. The forwarding table identifies interfaces on the network device that lead to devices on the network.

In general, in another aspect, the invention is directed to transmitting data packets from a network device having plural network interfaces. One of the plural network interfaces is designated for receiving data packets from a source address. First and second data packets are received from a device at the source address. It is determined if the second data packet was received over a network interface on the network device other than the designated network interface. If the second data packet was received over a network interface other than the designated network interface, it is determined if the first and second data packets were received within a predetermined period of time. If the first and second data packets were received within the predetermined period of time, the second data packet is discarded. If the first and second data packets were not received within the predetermined period of time, the second data packet is transmitted from the network device and a forwarding table on the network device is updated.

This aspect of the invention may include one or more of the following features. Updating the forwarding table includes changing the designated network interface to be the network interface over which the second data packet was received. The forwarding table identifies interfaces on the network device that lead to devices on the network. Determining if the first and second data packets were received within a predetermined period of time includes comparing a time that the first packet was received to a time that the second packet was received.

Other features and advantages of the invention will become apparent from the following description, including the claims and drawings.

DETAILED DESCRIPTION

Figure 1:
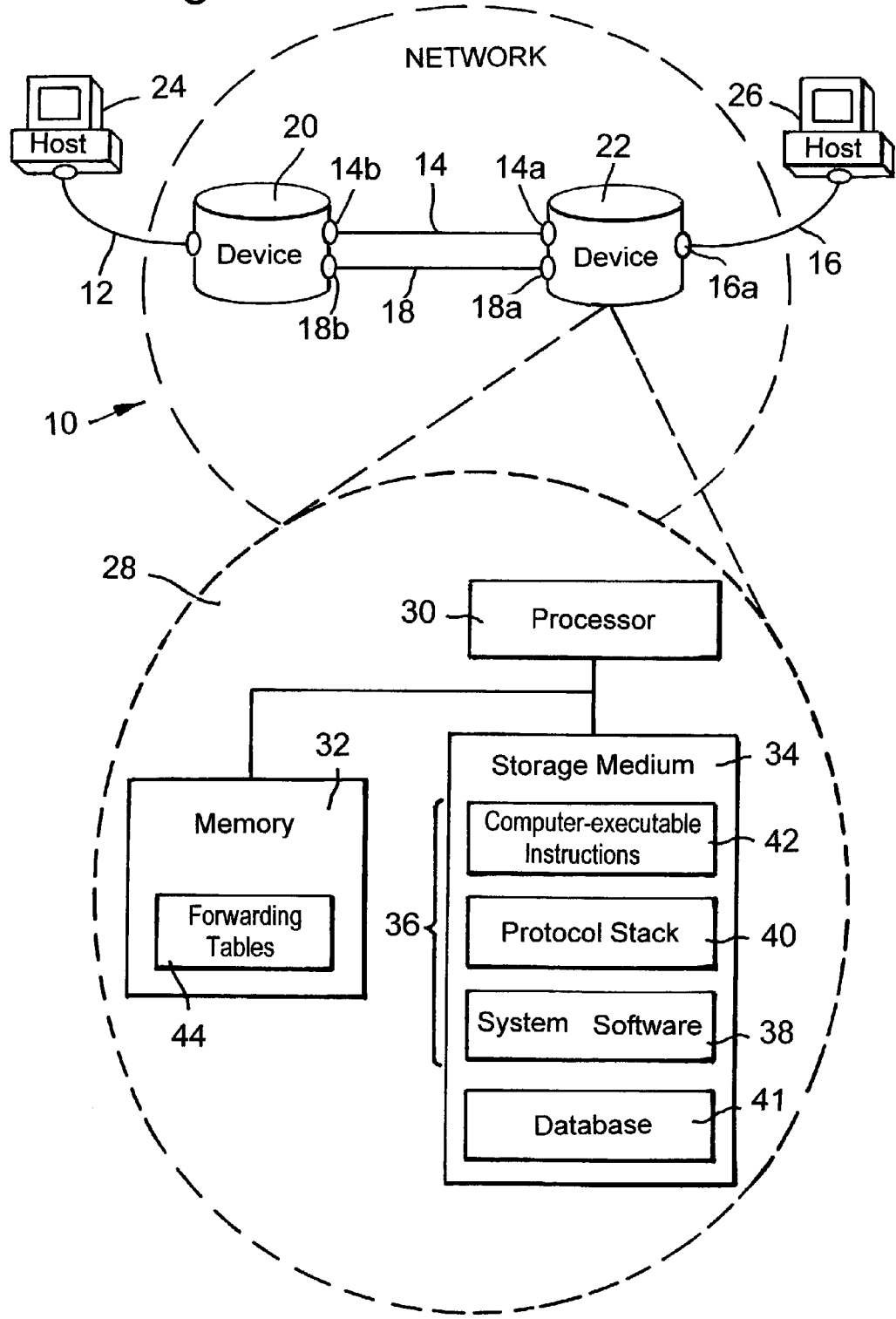
FIG. 1 is a block diagram of a network.

Referring to FIG. 1, a network 10 is shown. Network 10 may be a local area network (LAN), a wide area network (WAN), or any other type of computer network. Network 10 is a multi-segment network, which includes segments 12, 14, 16 and 18. Segments are paths on network 10 between network devices. Network devices 20 and 22 are interconnection components, such as bridges, routers, or any other computing device that is capable of receiving data packets and forwarding those packets along a path to their intended destination.

Network 10 includes parallel segments/paths 14 and 18 between network devices 20 and 22. Data packets are transmitted from host 24, through network 10, over parallel paths 14 and 18, to host 26. Hosts 24 and 26 are personal computers (PCs) or other networked computing devices that are capable of transmitting and receiving data over network 10.

The internal architecture of network device 22 is shown in view 28. Each network device contains a similar or identical architecture; therefore, only the architecture of network device 22 is described. Network device 22 includes a processor 30, a memory 32, and a storage medium 34.

Processor 30 executes computer programs stored in storage medium 34 out of memory 32 to perform various functions. Processor 30 may be a controller, microprocessor, or the like. Memory 32 is a random access memory (RAM) or the like.

Storage medium 34 may be a computer hard disk, redundant array of inexpensive disks (RAID), or any other non-volatile storage medium. Storage medium 34 stores computer programs 36. Computer programs 36 include system software 38 such as an operating system and operating software, a protocol stack 40 for communicating over network 10 (e.g., a TCP/IP stack (Transmission Control Protocol/Internet Protocol)), and executable instructions 42 for processing data packets to reduce packet loops as described below in FIG. 2. Storage medium 34 also stores a database 41 that contains system parameters and the like.

Memory 44 stores one or more forwarding tables 44. Forwarding tables 44 contain data identifying interfaces on network device 22 that lead to destinations. Specifically, the forwarding tables contain data identifying the network addresses of destination devices and specific interfaces out of device 22 that lead to those destination devices. In network 10, there are two possible destination network addresses: the network address of host 24 and the network address of host 26. Devices on network 10, including devices 20, 22, are not destination network addresses, since those devices are not the termination points of the packets. As noted, memory 32 is typically a volatile memory, such as a RAM. As a result, the forwarding tables are reconstructed for each new device power cycle. Likewise, in this embodiment, data in a device's forwarding tables is updated each time a new data packet is received by the device.

When a data packet is received by network device 22, e.g., from host 24 over path 14, network device 22 updates its forwarding table to indicate that path 14 leads to host 22. That way, when network device 22 receives a new data packet whose destination is host 24, network device 22 consults its forwarding table to determine that the new data packet should be forwarded out of the interface that corresponds to path 14.

As described below, a time stamp is also included in the forwarding tables. The time stamp is indexed to the network address and network interface, and indicates the time at which the last data packet having that network address was received over that interface. An example of a forwarding table construction is as follows:

| Network Address | Interface on Network Device | Time Stamp |
| --- | --- | --- |
| Host 24 Address | Interface to Path 14 | Time A |
| Host 26 Address | Interface to Path 16 | Time B |

Thus, the above table indicates that device 22 received a data packet from host 24 over path 14 and its corresponding interface at "Time A". It also indicates that device 22 received a data packet from host 26 over path 16 and its corresponding interface at "Time B". Another column may be included in the forwarding tables, as shown below, to indicate whether a path (or "link") on the network has failed. Processing in the case of failed links is described below.

When device 22 receives a new data packet containing a destination address, device 22 consults its forwarding table to determine if there is a network address that corresponds to the destination address. If so, device 22 forwards the data packet out of the corresponding interface. If the table does not contain a network address that corresponds to the destination address, network device 22 updates the table to include the source network address from the data packet and the interface over which the data packet was received. Network device 22 also transmits ("floods") the data packet out over its remaining interfaces in order to forward the data packet to its destination.

Heretofore, "flooding" packets could result in data packet loops where there are parallel paths, such as paths 14 and 18, between network devices. Network devices 20 and 22, however, execute instructions 42 to reduce the occurrence of data packet loops along parallel paths 14 and 18.

Figure 2:
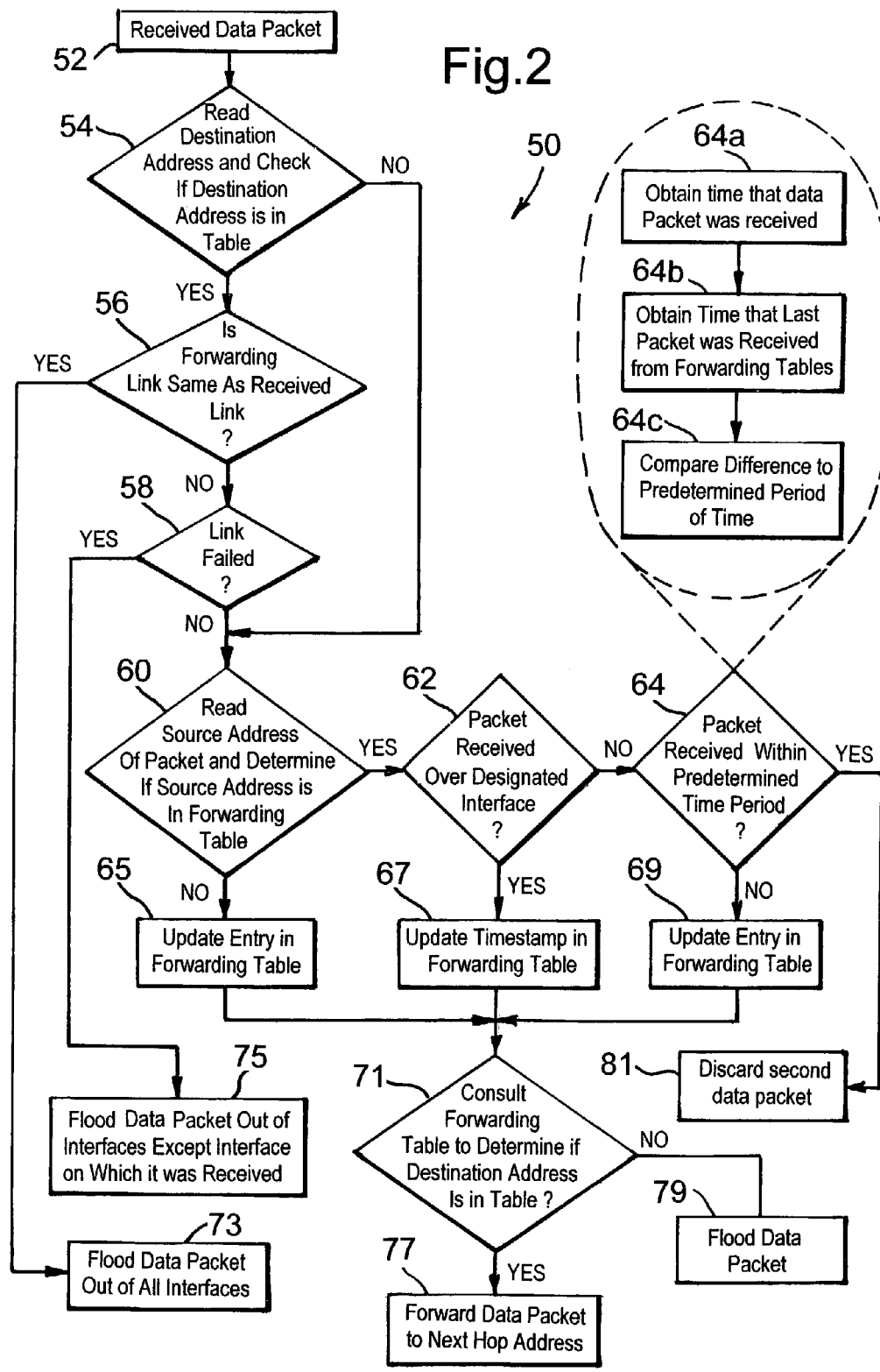
FIG. 2 is flowchart showing a process for reducing data packet looping in the network.

Referring to FIG. 2, a process 50 is shown, which is implemented by instructions 42 running in network devices 20, 22 to reduce the occurrence of data packet loops along parallel paths. For illustration's sake, it is assumed that process 50 is running on processor 30 in network device 22.

Process 50 receives (52) a data packet from network device 20 over path 14 and interface 14a. In this example, the data packet originated at host 24 and is destined for host 26. Process 50 reads (54) the destination address and checks to see if the destination address is in device 22's forwarding table 44. Assume, for the moment, that it is not.

Process 50 reads (60) the source network address of the data packet, which is the network address of host 24, and determines if that address is in forwarding table 44. Assume that an entry for the source network address already exists in device 22's forwarding table and that the data packet was received (62) over a network interface that is designated for that source network address (62). Process 50 then updates (67) the time stamp in forwarding table 44 to indicate that time that the data packet was received.

Process 50 also consults (71) forwarding table 44 to determine out of which interface on network device 22 to forward the data packet. More specifically, process 50 reads the destination address from the data packet and consults the forwarding table in network device 22 to determine which interface on network device 22 leads to the device at the destination address. If the forwarding table contains the necessary data, process 50 forwards (77) the data packet from interface 16a. Otherwise process 50 floods (79) the packet on all interfaces of device 22 except the interface 14a on which the packet was received.

Now, assume that process 50 receives (52) a second data packet with the same source network address as the first packet (i.e., both are the address of host 24). In this case, process 50 decides (62) if the second data packet was received over a network interface of device 22 that has been designated for the network address of host 24. Otherwise, process 50 updates (65) the forwarding table for device 22, as described below.

If the second data packet was received (62) over the designated interface, process 50 updates (67) the time stamp in forwarding table 44 and, if the destination address is in forwarding table 44 (71), transmits (77) the second data packet out of the appropriate device interface. On the other hand, if the second data packet was received over an interface other than the interface designated for host 24 in the forwarding table (62), process 50 determines (64) if the first and second data packets were received within a predetermined period of time. This predetermined period of time may be on the order of milliseconds to seconds.

In any case, if the first and second data packets were received over different interfaces within the predetermined period of time, process 50 concludes that the two data packets were received over parallel paths. For example, if device 20 receives a data packet from host 24 and device 20 does not have the destination address of the data packet in its forwarding table, device 20 will transmit the data packet out of its interfaces 14b and 18b, along parallel paths 14 and 18, respectively, to device 22. If device 22 receives these data packets having the same source address on different interfaces within the predetermined period of time, process 50 concludes that the two packets were received along parallel paths.

Since the two packets came along parallel paths, process 50 concludes that the packets are duplicates, i.e., that they were a result of device 20 flooding the packets out of all of its interfaces. Accordingly, process 50 discards (81) the later-received one of the two data packets. In this case, process 50 discards the second-received data packet. This reduces data packet looping since duplicate data packets will be discarded rather than "bouncing" back and forth between network devices 20 and 22.

Process 50 determines if the first and second data packets were received within the predetermined period of time as follows. Upon receipt of the second data packet, process 50 consults a hardware or software timer to obtain (64*a*) the time of receipt. Process 50 obtains (64*b*) the time of receipt of the first data packet from the forwarding table. Process 50 obtains the difference between the two times and compares (64*c*) that value to the predetermined period.

Returning to 64, if process 50 determines that the second data packet was not received by network device 22 within the predetermined period of time, process 50 concludes that there has been a change in the topology of network 10. That is, process 50 assumes that the reason the two data packets with the same source address were received over different paths/interfaces was because the topology of the network had changed in the intervening time between receipt of the first and second data packets. Accordingly, process 50 updates the forwarding table in network device 22 to reflect the new network topology. For example, assume that the forwarding table originally indicated that the path/interface to host 24 was path 14, as set forth in the following table.

| Network Address | Interface on Network Device | Time Stamp |
| --- | --- | --- |
| Host 24 Address | Interface to Path 14 | Time A |
| Host 26 Address | Interface to Path 16 | Time B |

In 69, process 50 updates the table, as follows, to indicate that the path/interface to host 24 is path 18.

| Network Address | Interface on Network Device | Time Stamp |
| --- | --- | --- |
| Host 24 Address | Interface to Path 18 | Time A |
| Host 26 Address | Interface to Path 16 | Time B |

Thus, in this example, the designated interface/path for host device 22 has been changed from top parallel path 14 to bottom parallel path 18. This change is reflected in the forwarding table 44 stored in memory 32 of network device 22.

In this case, the second data packet is not discarded. Instead, the second packet is forwarded to its intended destination. The process for forwarding the second data packet is as described above. That is, when device 22 receives the second data packet, device 22 consults its forwarding table to determine if there is an entry that corresponds to the destination address. If so, device 22 forwards the data packet out of the corresponding interface (77). If there is no address in the forwarding table, network device 22 transmits (floods) (79) the data packet out over its remaining interfaces. Process 50, executing now in network device 20, thus works to reduce data packet looping caused by network device 22 flooding the data packets.

Process 50 is not limited to use only with networks that have parallel data paths. Process 50 can also be used with a network having a topology such as that shown in FIG. 3.

Figure 3:
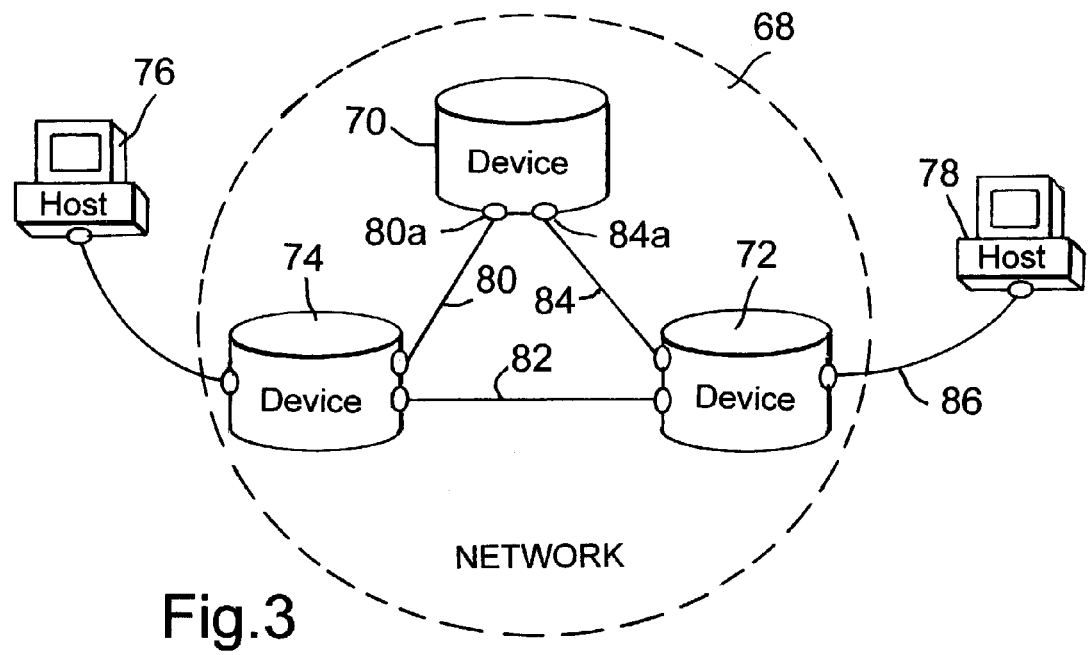
FIG. 3 is a block diagram of an alternative network topology in which the process of FIG. 2 may be used.

Referring to FIG. 3, in network 68, data packet loops may occur, e.g., if devices 70 and 72 do not have forwarding data for a data packet that originated from host 76. Assume that device 74 forwards a data packet along paths 80 and 82 to devices 70 and 72, respectively. If devices 70 and 72 do not contain forwarding data for the packet, devices 70 and 72 will duplicate the data packet and transmit (flood) the data packet out of all of their interfaces, except for the interfaces over which the data packet was originally received. So, in this case, device 70 forwards a copy of the data packet out of its interface corresponding to path 84, and device 72 forwards copies of the data packet out of its interfaces corresponding to paths 84 and 86. Device 70 will thus receive another copy of the data packet from device 72 and forward that copy to device 74, which will subsequently forward it back to device 72, and so on. Accordingly, a packet loop is created among devices 70, 72 and 74.

Process 50 is executed in devices 70, 72 and 74 to reduce the chances that such a loop will occur. For example, in the scenario described above, device 70 receives data packets with the same source address on interfaces 80*a* and 84*a* (from device 74 and device 72, respectively).

If the predetermined time period of process 50 is set appropriately, device 70 discards the second data packet it receives, e.g., the data packet from device 72. Device 70 forwards a copy of the data packet that it received from device 74 to device 72. Device 72 forwards that copy back to device 74 and to host 78.

If the predetermined time period of process 50 is set appropriately, device 74, also running process 50, determines that device 74 has received two data packets with the same source network address on two different network interfaces within the predetermined time period. Therefore, device 74 discards the later-received packet, i.e., the packet received from device 72, thus ending the data packet looping.

Figure 4:
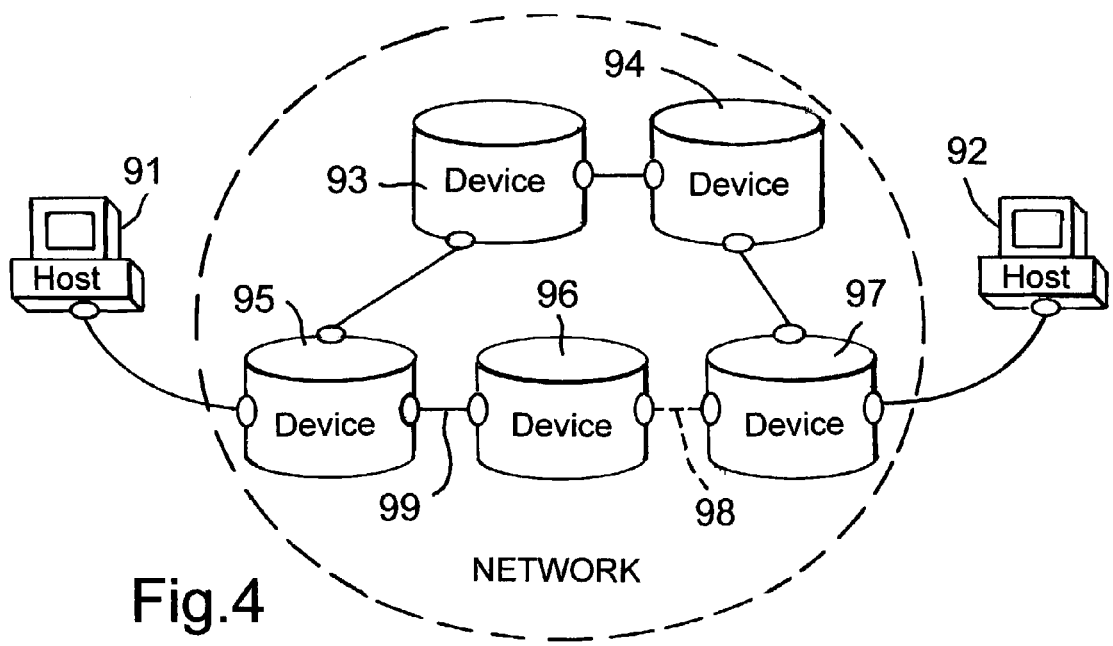
FIG. 4 is a block diagram of still another network topology in which the process of FIG. 2 may be used.

Referring to FIG. 4, a network 90 is shown. Network 90 contains hosts 91 and 92 and network devices 93 to 97, which are routers, bridges or the like, as above. Network 90 contains a failure on link 98, which is depicted as a dashed line. In the event of such a failure, the "normal" routing protocol results in device 96 dropping packets that are being transferred from host 91 to host 92. This is because packets normally are not sent back out of links on which they were received. So, if the forwarding table for device 95 causes packets to be transferred to device 96 over link 99, the failure of link 98 would result in those packets being dropped. Process 50 addresses this problem.

Interfaces on the devices detect link failures and report the link failures to process 50. If a failure is detected in link 98, process 50 updates the forwarding table of device 96 to indicate that link 98 has failed. Accordingly, in the example shown in FIG. 4, the forwarding table for device 96 will be as follows:

| Network Address | Interface on Network Device | Time Stamp | Link Failure? |
| --- | --- | --- | --- |
| Host 92 Address | Interface to Path 98 | Time A | Yes |
| Host 91 Address | Interface to Path 99 | Time B | No |

The "Link Failure?" column indicates that a failure has occurred in a corresponding link, here link 98.

When receiving data packets, process 50 consults the forwarding table to determine if there is a link failure (58). If so, process 50 floods (75) the data packet out of all of device 96's remaining (i.e. non-failed) links, including the link over which the packet was received. In this example, that link is link 99. Using other forwarding protocols, the data packet would not be sent out over the link on which the data packet was received.

Device 95, on receiving the data packet, looks-up (54) the destination address of the packet in the table to determine whether the forwarding interface is the same as the interface on which the packet was received (56). If so, device 95 assumes that there is a link failure and floods (73) the data packet on all interfaces except the one on which the data packet was received. Device 95 does this without performing any of the other checks mentioned above, and without updating the forwarding table. If there is no entry in the table for this address (60), processing continues. If a link is reactivated, any entries in the forwarding table with that link listed as next hop interface should be removed.

Other embodiments not described herein are also within the scope of the following claims. For example, process 50 can be used with network topologies other than those shown.

Process 50 is not limited to use with the particular hardware/software and network configuration of FIG. 1; it may find applicability in any computing or processing environment.

For example, process 50 may be implemented in hardware, such as programmable logic (e.g., a field programmable gate array (FPGA)) or an application-specific integrated circuit (ASIC), or combination of hardware and software.

Process 50 may be controlled by, and implemented in, computer programs executing on programmable computers that each includes a processor, a storage medium readable by the processor (including volatile and non-volatile memory and/or storage elements), at least one input device, and one or more output devices. Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the processes described above. The invention may also be implemented as a computer-readable storage medium, configured with a computer program, where, upon execution, instructions in the computer program cause the computer to operate to control the above processes.

It is to be understood that while the invention has been described in conjunction with the detailed description thereof, the foregoing description is intended to illustrate and not to limit the scope of the invention. Other aspects, advantages, and modifications are within the scope of the following claims.

What is claimed is:

1. A method for use in transmitting data packets on a network, the network including a network device including a designated network interface over which data packets having a feature are received, the method comprising the steps of:
   (a) determining if two data packets include the same feature;
   (b) determining if the two data packets were received by said network device within a predetermined period of time;
   (c) determining whether a latter-received of the two data packets was received over a network interface on the network device other than the designated network interface; and
   (d) the network device:
      (i) transmitting said latter-received of the two data packets if said two data packets were received over the designated network interface and the two data packets were received within the predetermined period of time;
      (ii) transmitting said latter-received of the two data packets if said two data packets were received over the designated network interface and the two data packets were not received within the predetermined period of time;
      (iii) transmitting said latter-received of the two data packets if the two data packets were not received by the network device within the predetermined period of time and said latter-received of the two data packets was received over a network interface on the network device other than the designated network interface; and
      (iv) discarding said latter-received of the two data packets if the two data packets were received by the network device within the predetermined period of time and said one of the two data packets was received over a network interface on the network device other than the designated network interface.

2. The method of claim 1, wherein a later-received one of the two data packets is discarded.

3. The method of claim 1, wherein determining comprises:
   receiving the two data packets at the network device;
   obtaining a difference between a time that the first of the two data packets was received and a time that a second of the data packets was received; and
   comparing the difference to the predetermined period of time.

4. The method of claim 3, wherein the time that the first data packet was received is stored in a memory of the network device.

5. The method of claim 1, wherein the feature comprises a source network device address.

6. The method of claim 1, further comprising:
   updating a forwarding table in the network device based on a source device address in the one of the two data packets.

7. The method of claim 6, wherein the forwarding table identifies interfaces on the network device that lead to devices on the network.

8. A method for use in transmitting data packets from a network device having plural network interfaces, one of the plural network interfaces being a designated network interface for receiving data packets from a source address, the method comprising:
   receiving a first data packet and then a second data packet, both the first and second data packets being received from a device at the source address; and
   determining if the second data packet was received over a network interface on the network device other than the designated network interface;
   wherein, if the second data packet was received over a network interface other than the designated network interface, the method further comprises:
   determining if the first and second data packets were received within a predetermined period of time;

wherein, if the first and second data packets were received within the predetermined period of time, the method further comprises discarding the second data packet; and wherein, if the first and second data packets were not received within the predetermined period of time, the method further comprises transmitting the second data packet and updating a forwarding table on the network device; and if the second data packet is received over the designated network interface, the method further comprises transmitting the second data packet and updating a forwarding table on the network device.

9. The method of claim 8, wherein updating comprises changing the designated network interface to be the network interface over which the second data packet was received.

10. The method of claim 8, wherein the forwarding table identifies interfaces on the network device that lead to devices on the network.

11. The method of claim 8, wherein determining if the first and second data packets were received within a predetermined period of time comprises comparing a time that the first packet was received to a time that the second packet was received.

12. A computer program stored on a computer-readable medium for use in transmitting data packets on a network, the network including a network device including a designated network interface over which data packets having the feature are received the computer program comprising executable instructions that cause a processor to:

(a) determine that two packets include the same feature;
(b) determine if the two data packets having a same feature were received by said network device within a predetermined period of time;
(c) determine whether a latter-received of the two data packets was received over a network interface on the network device other than the designated network interface; and
(d)
 (i) transmitting said latter-received of the two data packets if said two data packets were received over the designated network interface if the two data packets were received within the predetermined period of time;
 (ii) transmitting said latter-received of the two data packets if said two data packets were received over the designated network interface if the two data packets were not received within the predetermined period of time;
 (iii) transmit said latter-received of the two data packets if the two data packets were not received by the network device within the predetermined period of time and said latter-received of the two data packets was received over a network interface on the network device other than the designated network interface, and
 (iv) discard said latter-received of the two data packets if the two data packets were received by the network device within the predetermined period of time and said latter-received of the two data packets was received over a network interface on the network device other than the designated network interface.

13. The computer program of claim 12, wherein a later-received one of the two data packets is discarded.

14. The computer program of claim 12, wherein determining comprises:

receiving the two data packets receiving the two data packets at the network device;

obtaining a difference between a time that the first of the two data packets was received and a time that a second of the data packets was received; and comparing the difference to the predetermined period of time.

15. The computer program of claim 14, wherein the time that the first data packet was received is stored in a memory of the network device.

16. The computer program of claim 12, wherein the feature comprises a source network device address.

17. The computer program of claim 12, wherein the computer program further comprises executable instructions that cause the processor to:

update a forwarding table in the network device based on a source device address in the one of the two data packets.

18. The computer program of claim 17, wherein the forwarding table identified interfaces on the network device that lead to devices on the network.

19. A computer program stored on a computer-readable medium for use in transmitting data packets from a network device having plural network interfaces, one of the plural network interfaces being a designated network interface for receiving data packets from a source address, the computer program comprising instructions that cause a processor to:

receive a first data packet and then a second data packet, both the first and second data packets being received from a device at the source address; and determine if the second data packet was received over a network interface on the network device other than the designated network interface;

wherein, if the second data packet was received over a network interface other than the network interface, the computer program executes instructions to:

determine if the first and second data packets were received within a predetermined period of time;

wherein, if the first and second data packets were received within the predetermined period of time, the computer program causes the processor to discard the second data packet; and wherein, if the first and second data packets were not received within the predetermined period of time, the computer program causes the processor to transmit the second data packet and updating a forwarding table on the network device; and wherein if the second data packet was received over the designated network interface the method further comprises transmitting the second data packet and updating a forwarding table on the network device.

20. The computer program of claim 19, wherein updating comprises changing the designated network interface to be the network interface over which the second data packet was received.

21. The computer program of claim 19, wherein the forwarding table identifies interfaces on the network device that lead to devices on the network.

22. The computer program of claim 19, wherein determining if the first and second data packets were received within a predetermined period of time comprises comparing a time that the first packet was received to a time that the second packet was received.

23. A network device for transmitting data packets on a network, the network device including a designated network interface over which data packets having the feature are received and comprising circuitry which:

(a) determines if two data packets having a same feature were received by said network device within a predetermined period of time;

(b) determines whether a latter-received of the two data packets was received over a network interface on the network device other than the designated network interface; the network device
  (i) transmitting said latter-received of the two data packets if said two data packets were received over the designated network interface and the two data packets were received within the predetermined period of time;
  (ii) transmitting said latter-received of the two data packets if said two data packets were received over the designated network interface if the two data packets were not received within the predetermined period of time;
  (iii) transmitting said latter-received of the two data packets if the two data packets were not received by the network device within the predetermined period of time and said latter-received of the two data packets was received over a network interface on the network device other than the designated network interface, and
  (iv) discarding said latter-received of the two data packets if the two data packets were received by the network device within the predetermined period of time and said latter-received of the two data packets was received over a network interface on the network device other than the designated network interface.

24. The network device of claim 23, wherein a later-received one of the two data packets is discarded.

25. The network device of claim 23, wherein determining comprises:
  receiving the two data packets at the network device;
  obtaining a difference between a time that the first of the two data packets was received and a time that a second of the data packets was received; and
  comparing the difference to the predetermined period of time.

26. The network device of claim 25, wherein the time that the first data packet was received is stored in a memory of the network device.

27. The network device of claim 23, wherein the feature comprises a source network device address.

28. The network device of claim 23, wherein the one of the two data packets is a later-received data packet.

29. The network device of claim 28, wherein the circuitry:
  updates a forwarding table in the network device based on a source device address in the one of the two data packets.

30. The network device of claim 29, wherein the forwarding table identifies interfaces on the network device that lead to devices on the network.

31. A network device having plural network interfaces for transmitting data packets, one of the plural network interfaces being a designated network interface for receiving data packets from a source address, the network device comprising circuitry which:
  receives a first data packet and then a second data packet, both the first and second data packets being received from a device at the source address; and
  determines if the second data packet was received over a network interface on the network device other than the designated network interface;
  wherein, if the second data packet was received over a network interface other than the network interface, the circuitry:
  determines if the first and second data packets were received within a predetermined period of time;
  wherein, if the first and second data packets were received within the predetermined period of time, the circuitry discards the second data packet; and
  wherein, if the first and second data packets were not received within the predetermined period of time, the circuitry transmits the second data packet and updates a forwarding table on the network device; and
  If the second data packet was received over the designated network interface the circuitry transmits the second data packet and updates a forwarding table on the network device.

32. The network device of claim 31, wherein updating comprises changing the designated network interface to be the network interface over which the second data packet was received.

33. The network device of claim 31, wherein the forwarding table identifies interfaces on the network device that lead to devices on the network.

34. The network device of claim 31, wherein determining if the first and second data packets were received within a predetermined period of time comprises comparing a time that the first packet was received to a time that the second packet was received.

35. The network device of claim 31, wherein the circuitry comprises a memory which stores executable instructions and a processor which executes the instructions.

36. The network device of claim 31, wherein the circuitry comprises one or more of programmable logic and discrete hardware components.

* * * * *